June 14, 1927.
L. E. HOLLAND
1,632,229
ROTARY SPRINKLER
Filed May 11, 1925
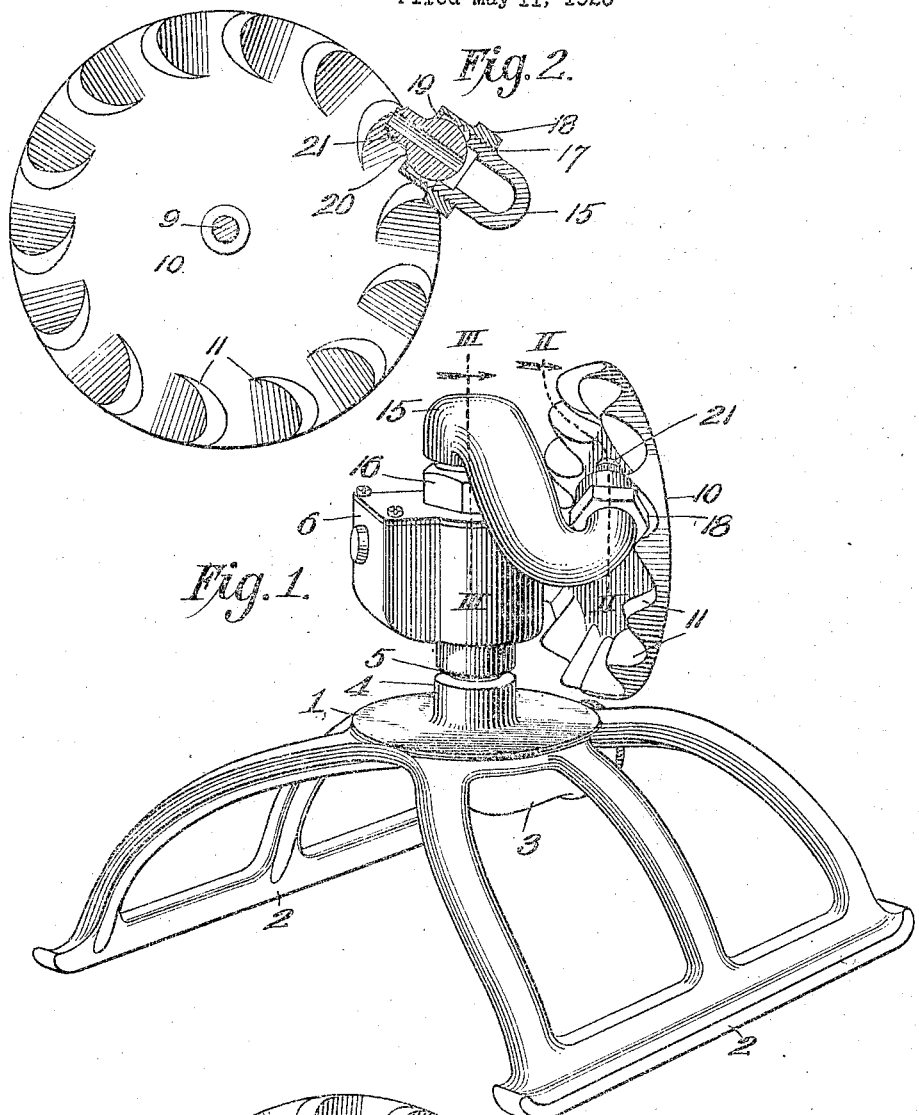
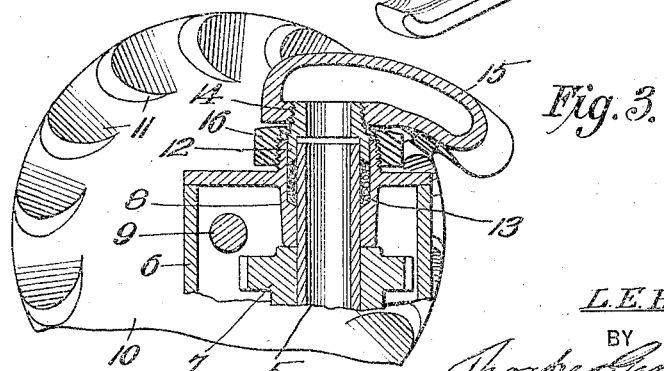
INVENTOR,
L. E. Holland
BY
ATTORNEYS.

Patented June 14, 1927.

1,632,229

UNITED STATES PATENT OFFICE.

LOUIS E. HOLLAND, OF KANSAS CITY, MISSOURI.

ROTARY SPRINKLER.

Application filed May 11, 1925. Serial No. 29,442.

This invention relates to sprinklers for golf link greens and lawns, of that class in which the force of a stream of water issuing under pressure from a nozzle, is utilized by impingement on a bladed wheel to revolve the latter around a horizontal axis and at the same time cause the wheel and nozzle to travel around a vertical axis so that the water shall be sprayed over a circular area of which the vertical axis is the center, and the chief object of the invention is to provide a nozzle adjustable for directing the water at different angles against the wheel in the path of the blades.

A further object is to provide a sprinkler having a sled stand or base permitting the sprinkler to be shifted readily from one position to another without danger of overturning or of injury to the "green" or lawn being sprinkled.

With these general objects in view, the invention consists in certain novel and useful features of construction and organization of parts as hereinafter described and claimed; and in order that it may be fully understood, reference is to be had to the accompanying drawing, in which:—

Figure 1 is a perspective view of a water sprinkler embodying the invention.

Figure 2 is a section on the line II—II of Figure 1.

Figure 3 is a section on the line III—III of Figure 1.

In the said drawing, the base of the device is of skeleton sled form arched transversely, 1 indicating the central or top portion and 2 the side or runner portions. The latter are parallel and horizontal at their lower ends so that the sprinkler can be readily drawn over a "green" or lawn without injury thereto, and their ends are upturned to enable the runners to pass over irregularities of surface without catching thereon. The central or top portion is formed with an elbow comprising a horizontal arm 3 extending parallel with the runners for the attachment of a hose, and an arm 4 extending upward from the top for the attachment of a short vertical stand pipe 5.

A box 6 is journaled on pipe 5 and rigidly carries a toothed wheel 7, upon which rests a depending internal hub-flange 8 of the box for the support of the latter.

A horizontal shaft 9 is journaled in the box and adapted through gearing, not shown, as forming no novel part of this invention, to cause the box to turn horizontally on the stand pipe, reference being here made for a full understanding of the arrangement of such gearing to applicant's copending allowed application Serial No. 660,730, which will issue on or about May 26, 1925.

Secured on the said shaft exterior to the box is a wheel 10 having a circular series of angular blades 11 on the face adjacent the box, the impingement of a stream of water under sufficient pressure, upon the blades causing the wheel to revolve and spray the water. The rotation of the wheel, through the shaft 9, and the gearing mentioned, causing the box, with the wheel, to turn in a horizontal plane on the stand pipe so that the water sprayed shall moisten a circular area of which the stand pipe constitutes the center, as true of all sprinklers where the spraying wheel revolves around its own axis and travels circularly around another axis.

A short pipe section 12 fits rotatably on the upper end of the stand pipe and has a water-tight relation thereto by bearing upon packing 13 in an enlargment of the bore of the hub portion 8 of the box, and secured at 14 upon the upper end of pipe section 12 is a curved nozzle 15. A nut 16 is screwed on the upper end of the hub portion 8, and overlaps a shoulder of pipe section 12 to prevent dislocation thereof from the stand pipe, and screwed at 17 on the outer end of the curved nozzle is a nut 18 having an inturned flange 19 for holding the spherical end 20 of a nozzle tip 21, against the outer extremity of the nozzle with sufficient pressure to prevent accidental movement of the tip, which directs the jet of water from the nozzle against the bladed portion of the wheel 10, for the purpose of revolving the latter and causing it, with the nozzle and box to turn on the stand pipe, as hereinbefore explained. The nozzle tip is adjustable to vary the angle of the jet of water discharged so that the diameter of the area on which the water falls shall be under the control of the person in charge. Because of this it is practicable to employ the nozzle for watering lawns as well as unrestricted areas, such as golf greens.

From the above description, it will be apparent that I have produced a device of the character described which possesses all the features of advantage set forth as desirable; and while I have described and claimed the preferred embodiment of the same, I reserve the right to make all changes properly falling within the spirit and scope of the appended claims.

I claim:

1. In a water sprinkler, the combination of a rotatable wheel having a circular series of blades set at an angle to the face of the wheel, and a nozzle, a nut screwed on the nozzle and provided at its front end with an inturned flange, and a discharge tip having a spherical portion fitting in the nut and clamped by the inturned flange against the end of the nozzle and susceptible of adjustment to change the angle of discharge relative to the face of the blades.

2. In a water sprinkler, a base, an upright water pipe carried by the base, a nozzle in communication with the discharge end of the said pipe, a bladed wheel having a circular series of inclined blades in the path of discharge of the nozzle, and a tip for the discharge end of the nozzle and adjustable to different angular positions relative to the blades of the wheel.

In witness whereof I hereunto affix my signature.

LOUIS E. HOLLAND.